United States Patent Office 2,894,875
Patented July 14, 1959

2,894,875
METHOD OF PRODUCING THE HIGHLY PURIFIED LUTEINIZING GONADOTROPIC FACTOR

Hans Maier-Huser and Roland Bourrillon, Paris, France, assignors to Société de l'Institut de Sérothérapie, Paris, France, a body corporate of France No Drawing. Application May 20, 1957
Serial No. 660,079

Claims priority, application France May 22, 1956

8 Claims. (Cl. 167—74)

This invention relates to a method of producing the highly purified luteinizing gonadotropic factor. More particularly, it refers to the luteinizing gonadotropic factor and to a method of preparing the same in highly purified form.

It is generally and conventionally considered that the serum gonadotropic hormone has a twofold activity; namely, the action as follicle stimulating hormone, indicated as FSH, and the luteinizing hormone, indicated as LH.

C. Werth concluded in a series of articles, Arzenimittel-Forschung, 5, 1955, 411, 735; 6, 1956, 79, that it has not been possible so far to isolate or to enrich either one of these two active principles.

The present invention relates to a method or process which makes it possible to obtain good yield of a highly active LH principle, the specific luteinizing activity of which is at least twice as great as that of the initial serum gonadotropic preparation used in the process.

According to the invention herein the process includes treating a gonadotropic preparation in which a precipitation step is effected in a dilute alcoholic medium by means of salts of elements of group II of the periodic table and especially salts of magnesium, calcium, strontium, zinc, and cadmium such as the acetates of zinc or cadmium operating preferably at a pH in excess of 5, of aqueous solutions or other preparations containing the serum gonadotropic hormone prepared in a manner known per se.

After the resultant precipitate which is inactive has been removed, the remaining liquid is adjusted to a pH in excess of 7, preferably ranging from 7.9 to 9.0, and allowed to stand 12 hours in the cold, preferably at $+2°$ C. The resultant precipitate, which comprises the FSH factor and a little of the LH factor, is purified by dialysis or by ultrafiltration and is then lyophilized. The solution which contains the luteinizing factor is dialyzed or ultrafiltered after having been acidified slightly, and is then lyophilized. Repeating this operation, a product of very high activity is finally produced, whose degree of purity may reach 13,000 international units, i.e., I.U./LH per mg. or even more. The yield in relation to the starting material is almost 100%.

If the method according to the process of the invention is applied to chorionic gonadotropic hormone preparations, a powder is produced which comprises 8,000 I.U. of luteinizing hormone per mg. with a yield of about 90%. It is easy to produce an even more pronounced purification of the product by repeating the treatment according to the process of the invention.

It is to be noted that all operations in the presently disclosed invention are to be carried out cold, preferably at $+2°$ C., since working at different temperatures would produce losses of the active substance.

The invention is more clearly illustrated by the following examples which are not to be considered as restrictive of the invention.

Example I 200 mg. of a dry powder of serum gonadotropic hormone prepared in the usual manner, containing 4,900 I.U. of FSH and 5,700 I.U. of LH per mg., are dissolved in 8.3 cc. of distilled water while being chilled with ice.

The pH of this solution is adjusted at 5.8 by means of a little dilute mild organic acid such as acetic acid. 2 cc. of cold absolute ethyl alcohol are then added under stirring, and a weak inactive resultant precipitate is separated by centrifuging. The clear or limpid liquid is diluted with 22.5 cc. of cold ethyl alcohol. While shaking and chilling with ice, 400 mg. of finely pulverized zinc acetate are added. The pH is again fixed at 5.8 by means of adding dilute acetic acid, and the inactive precipitate which forms is separated by centrifuging.

The pH of the solution is then brought to 7.9, while being agitated and chilled with ice, by means of a buffer solution of pH 10 formed by a molar solution of ammonium chloride/ammonia in 19% ethyl alcohol. The solution is allowed to stand at $+2°$ C. for 15 hours in a refrigerator and the resultant precipitate called herein as precipitate A is then separated by centrifuging.

The precipitate A and the above solution, called herein solution B, obtained in this manner are then subjected to the following operation:

Precipitate A is suspended in a small amount of distilled water and dissolved, at 5.6 pH, by adding acetic acid. Dialysis is then carried out for 20 hours against running water in a cellophane tube in a cold chamber at $+2°$ C. The content of the tube is lyophilized. This produces 92 mg. of a light white powder comprising the FSH factor and a small percentage of the LH factor.

The solution B is brought to a pH of 6 by means of adding dilute acetic acid, and then dialyzed and lyophilized as described above respecting A. This produces 86.5 mg. of a voluminous or bulky white powder which is easily soluble in water, calculated as containing 10,740 I.U. of the LH factor per mg. and 1,740 I.U. of the FSH factor. The LH factor yield is 82% and the FSH factor yield 15% relative to the starting material.

It will be noted that the activity of the luteinizing principle preparation thus obtained is more than twice as great as that of the starting material, whereas the percentage of the FSH factor is decreased by more than 65%.

Repeating the process for preparing the already purified LH factor, a luteinizing fraction is produced which may comprise up to 13,000 I.U./LH per mg. and more, and only 1,400 I.U./FSH. The yield of the LH factor is close to 100%.

Example II 200 mg. of a dry powder of chorionic gonadotropic hormone prepared in the usual manner from the urine of pregnant women, and containing 4,834 I.U./LH per mg. of powder, are dissolved under exactly the same conditions as those described in Example I, using the same quantities of alcohol and zinc acetate.

After the pH has been fixed at 7.9 by means of a buffer solution such as indicated in Example I, a precipitate A is produced which only contains impurities and has no hormonal activity. This precipitate is thrown away after centrifuging. The remaining liquid B, the pH of which is adjusted to 5.6 by means of dilute acetic acid, is ultrafiltered. The product remaining on the filter yields, after lyophilization, 105 mg. of a dry powder comprising 8,000 I.U. of luteinizing hormone per mg. The yield in this example is 87% in relation to the starting material. By repeating the process described above with this product, it is possible to produce a greater purification without further loss.

*Example III*

The method described in example I is followed and the zinc salt is replaced by cadmium salt. The precipitate produced by the addition of the cadmium acetate is discarded or is thrown away. The pH of the supernatant solution is adjusted to 9 by means of a normal solution of 19% alcohol solution of caustic potash. The precipitate, formed when cold, is then eliminated by centrifuging. The precipitate and the liquid are then treated separately as has been described in Example I hereinabove.

From the foregoing description of the inention and the accompanying illustrative examples, it will be noted that there is provided a method of process of obtaining a luteinizing gonadotropic factor in relatively highly concentrated form. According to the disclosed invention, there is obtained a yield of almost 100% in increased concentration and wherein the I.U. has been practically doubled thereby obtaining a more pure form of product that is more effective but simpler to use in connection with the treatment of the body requiring the herein type of hormone factors. It will be further noted that these two active principles herein, because of their high degree of purity, provide a more effective procedure for the treatment of the human body having such hormonal deficiencies or dysfunctioning.

While several embodiments of the invention herein have been described, it is to be understood that modifications as to form or procedure of operation, use and arrangement of materials necessary for purification may be made without departing from the spirit and scope of the invention as claimed.

We claim:

1. In a process of producing highly active luteinizing hormone preparations, the steps comprising adjusting the pH-value of an aqueous-alcoholic solution containing the luteinizing hormone and impurities at a temperature of about +2° C. to a pH of about 5.8, adding to said solution at said temperature of about +2° C. the salt of a metal selected from the group consisting of magnesium, calcium, strontium, zinc, and cadmium, said salt being soluble in said aqueous-alcoholic solution at said pH of 5.8, separating the resulting inactive precipitate, adjusting the pH-value of the remaining solution to a pH between about 7.9 and about 9.0 while maintaining the temperature of the solution at about +2° C., allowing the solution to stand at said temperature of +2° C. until precipitation is completed, separating the resulting precipitate from the solution and isolating the luteinizing hormone from said solution.

2. The process according to claim 1, wherein the aqueous-alcoholic solution containing the luteinizing hormone is a solution also containing the follicle stimulating hormone.

3. The process according to claim 1, wherein the aqueous-alcoholic solution containing the luteinizing hormone is the solution of a chorionic gonadotropic hormone obtained from the urine of pregnant women.

4. The process according to claim 1, wherein the salt of a metal added to the aqueous-alcoholic solution containing the luteinizing hormone is zinc acetate.

5. In a process of producing highly active luteinizing hormone preparations, the steps comprising adjusting the pH-value of an aqueous-alcoholic solution containing the luteinizing hormone and impurities at a temperature of about +2° C. to a pH of about 5.8, adding to said solution at said temperature of about +2° C. the salt of a metal selected from the group consisting of magnesium, calcium, strontium, zinc, and cadmium, said metal salt being soluble in said aqueous-alcoholic solution at said pH of 5.8, separating the resulting inactive precipitate, adjusting the pH-value of the remaining solution to a pH between about 7.9 and about 9.0 while maintaining the temperature of the solution at about +2° C., allowing the solution to stand at said temperature of +2° C. until precipitation is completed, separating the resulting precipitate from the solution, adjusting the pH-value of the solution to a pH of about 6.0, and dialyzing and lyophilizing said solution.

6. In a process of producing highly active luteinizing hormone preparations, the steps comprising adjusting the pH-value of an aqueous-alcoholic solution containing the luteinizing hormone and impurities at a temperature of about +2° C. to a pH of about 5.8, adding to said solution at said temperature of about +2° C. the salt of a metal selected from the group consisting of magnesium, calcium, strontium, zinc, and cadmium, said metal salt being soluble in said aqueous-alcoholic solution at said pH of 5.8, separating the resulting inactive precipitate, adjusting the pH-value of the remaining solution to a pH between about 7.9 and about 9.0 while maintaining the temperature of the solution at about +2° C., allowing the solution to stand at said temperature of +2° C. until precipitation is completed, separating the resulting precipitate from the solution, adjusting the pH-value of the solution to a pH of about 6.0, dialyzing and lyophilizing said solution, dissolving the resulting luteinizing hormone in aqueous alcohol, and repeating the steps of adjusting the pH-value of said aqueous-alcoholic solution to a pH of about 5.8, adding thereto the salt of a metal selected from the group consisting of magnesium, calcium, strontium, zinc, and cadmium, separating the resulting precipitate, adjusting the pH-value of the remaining solution to a pH between about 7.9 and about 9.0, allowing the solution to stand until precipitation is completed, the temperature of the solution during these steps being maintained at about +2° C., separating the resulting precipitate from the solution, and isolating the luteinizing hormone from said solution.

7. In a process of producing highly active luteinizing hormone preparations, the steps comprising adjusting the pH-value of an aqueous-alcoholic solution containing the luteinizing hormone and impurities at a temperature of about +2° C. to a pH of about 5.8, adding to said solution at said temperature of about +2° C. zinc acetate in an amount corresponding to an amount of approximately 400 mg. of zinc acetate for 200 mg. of a starting material containing, per mg. 5700 I.U. of luteinizing hormone and 4900 I.U. of follicle stimulating hormone in said aqueous-alcoholic solution, separating the resulting inactive precipitate, adjusting the pH-value of the remaining solution to a pH between about 7.9 and about 9.0 while maintaining the temperature of the solution at about +2° C., allowing the solution to stand at said temperature of +2° C. until precipitation is completed, separating the resulting precipitate from the solution, and isolating the luteininzing hormone from said solution.

8. In a process of producing highly active luteinizing hormone preparations, the steps comprising adjusting the pH-value of an aqueous-alcoholic solution containing the luteinizing hormone and impurities at a temperature of about +2° C. to a pH of about 5.8, adding to said solution at said temperature of about +2° C. ethanol, separating the resulting inactive precipitate, further diluting the remaining solution with ethanol, adding thereto, while maintaining a temperature of about +2° C. and a pH of about 5.8, the salt of a metal selected from the group consisting of magnesium, calcium, strontium, zinc, and cadmium, said metal salt being soluble in said aqueous-alcoholic solution at said pH of 5.8, separating the resulting inactive precipitate, adjusting the pH-value of the remaining solution to a pH between about 7.9 and about 9.0 while maintaining the temperature of the solution at about +2° C., allowing the solution to stand at said temperature of +2° C. until precipitation is completed, separating the resulting precipitate from the solution, and isolating the luteinizing hormone from said solution.

References Cited in the file of this patent

FOREIGN PATENTS 644,060    Great Britain _____ Aug. 7, 1947

OTHER REFERENCES

Malburg: J. of Clinical Endocrinology, vol. 14, No. 6, June 1954, pp. 666–671.

Leathem: Am. J. Physiology, vol. 145, November 1945–March 1946, pp. 28–31.

Bradbury: Proc. Soc. Exptl. Biol. and Med., vol. 71, June 1949, pp. 228–232.